United States Patent [19]

Delabastita

[11] Patent Number: 5,828,463
[45] Date of Patent: Oct. 27, 1998

[54] PRINTING PLATE FOR A HALFTONE IMAGE HAVING TONER DEPENDENT ROSETTE STRUCTURES BV PHASE MODULATION

[75] Inventor: Paul Delabastita, Antwerp, Belgium

[73] Assignee: Agfa-Gevaert N.V., Belgium

[21] Appl. No.: 819,499

[22] Filed: Mar. 17, 1997

Related U.S. Application Data

[63] Continuation of Ser. No. 430,008, Apr. 27, 1995.

[30] Foreign Application Priority Data

Apr. 27, 1994 [EP] European Pat. Off. .............. 94201150

[51] Int. Cl.[6] ........................... H04N 1/405; G03G 13/28
[52] U.S. Cl. .......................... 358/298; 358/296; 358/454; 358/533; 430/49

[58] Field of Search ................................... 358/296, 298, 358/454, 455, 456, 457, 458, 459, 465, 466, 534, 535, 536; 399/1, 2; 430/48, 49, 300, 301

[56] References Cited

U.S. PATENT DOCUMENTS 5,731,114  3/1998  Evenstad et al. ......................... 430/49

*Primary Examiner*—Peter S. Wong
*Assistant Examiner*—Derek J. Jardieu
*Attorney, Agent, or Firm*—Robert A. Sabourin

[57] ABSTRACT

A screening system comprises at least one screen of which the phase is tone or image level dependent. This tone dependent phase shift influences the rosette structure and can be used to improve the neutral balance and color fidelity in multi-color reproduction and to minimize the visibility of such rosette structures in highlight and shadow areas.

6 Claims, 14 Drawing Sheets

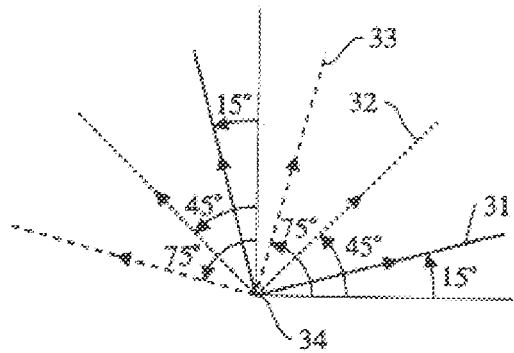
Fig. 1.a
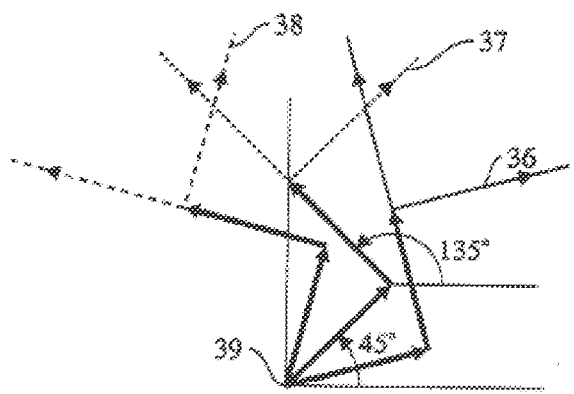
Fig. 1.d
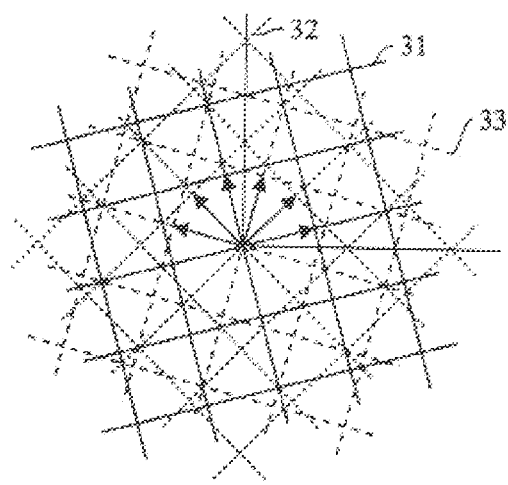
Fig. 1.b
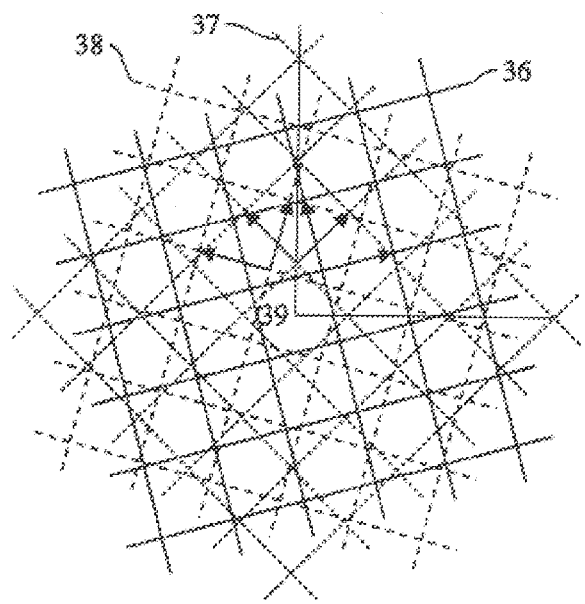
Fig. 1.e
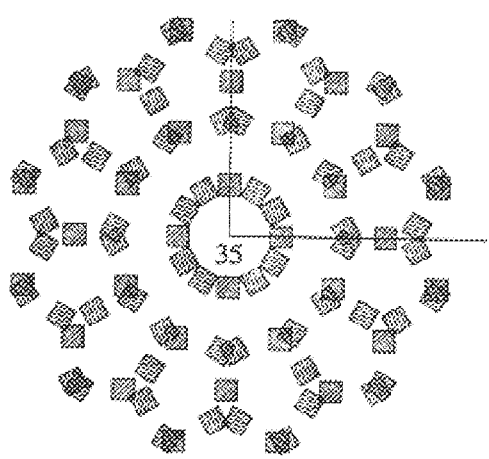
Fig. 1.c
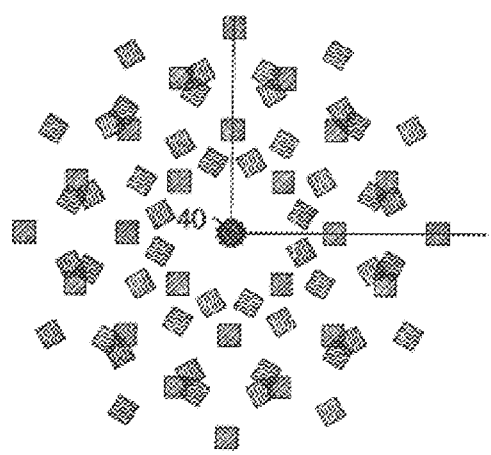
Fig. 1.f
Fig. 1

Fig. 2
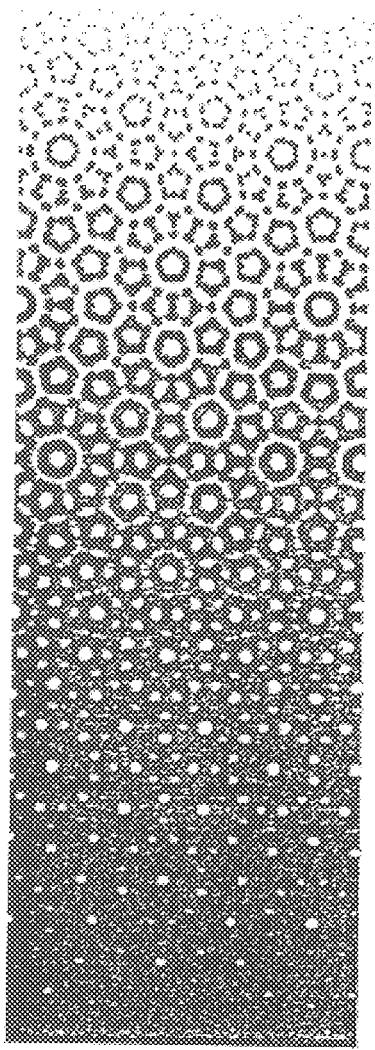
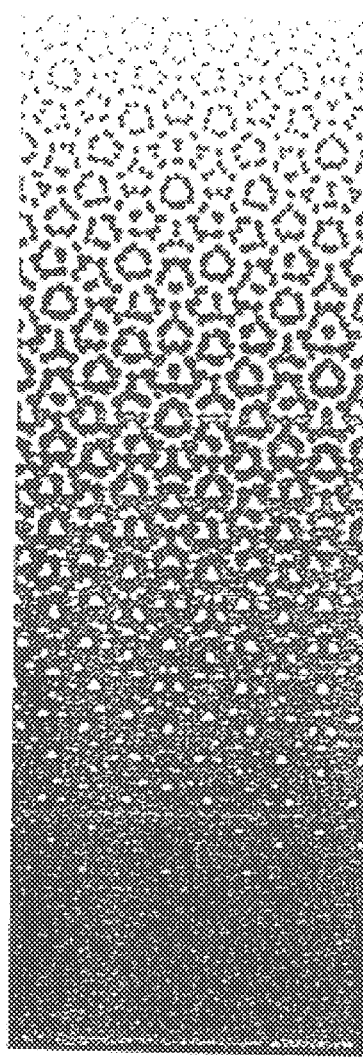
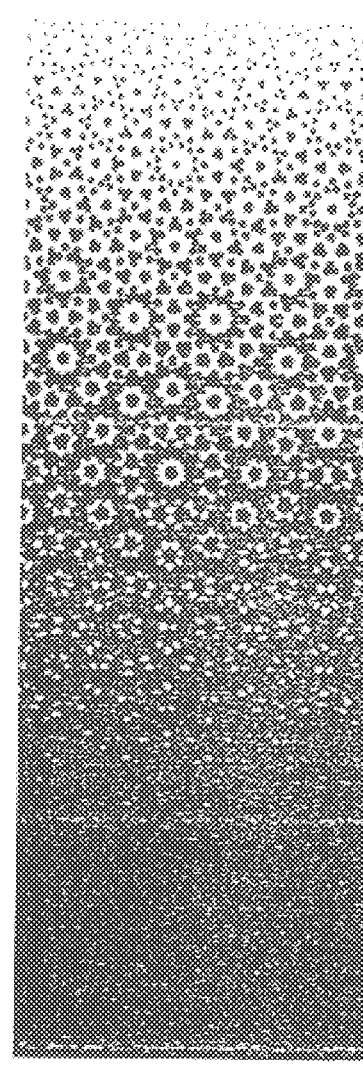
Fig. 2.a  Fig. 2.b  Fig. 2.c

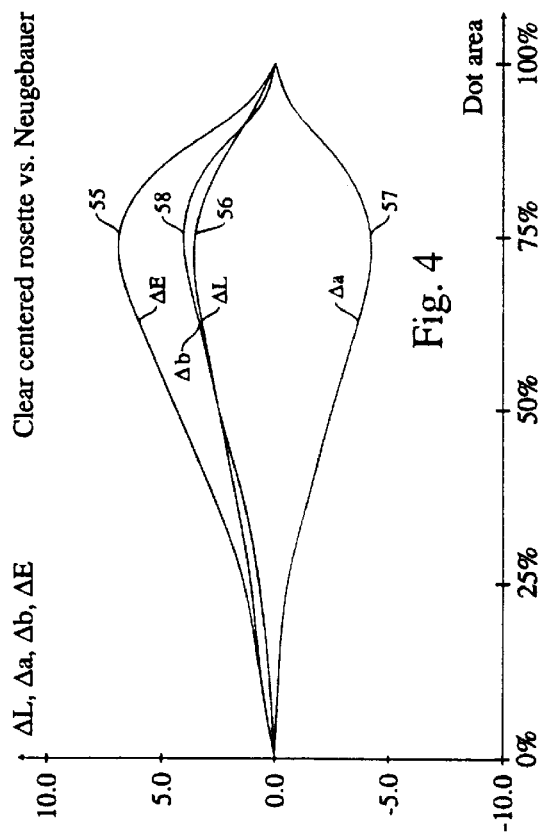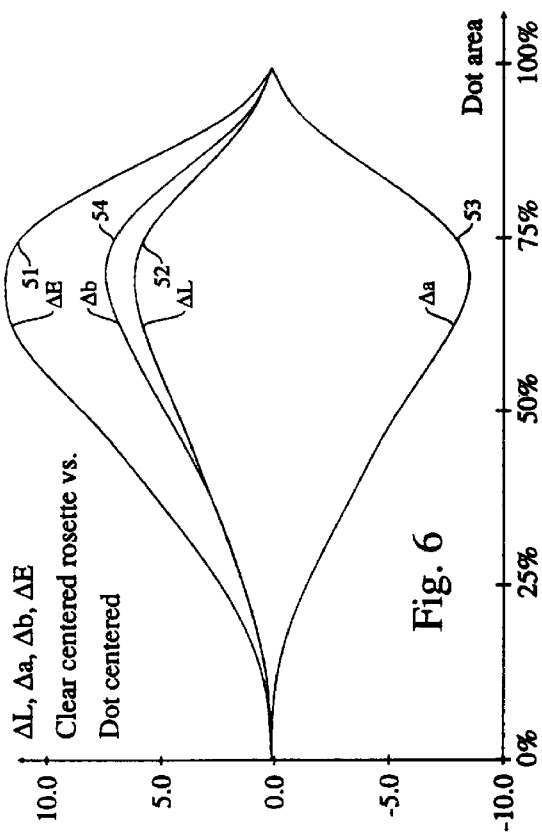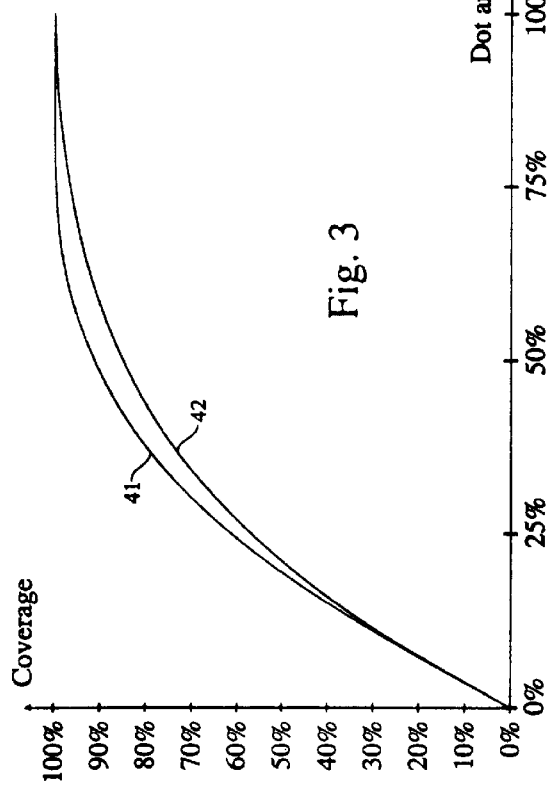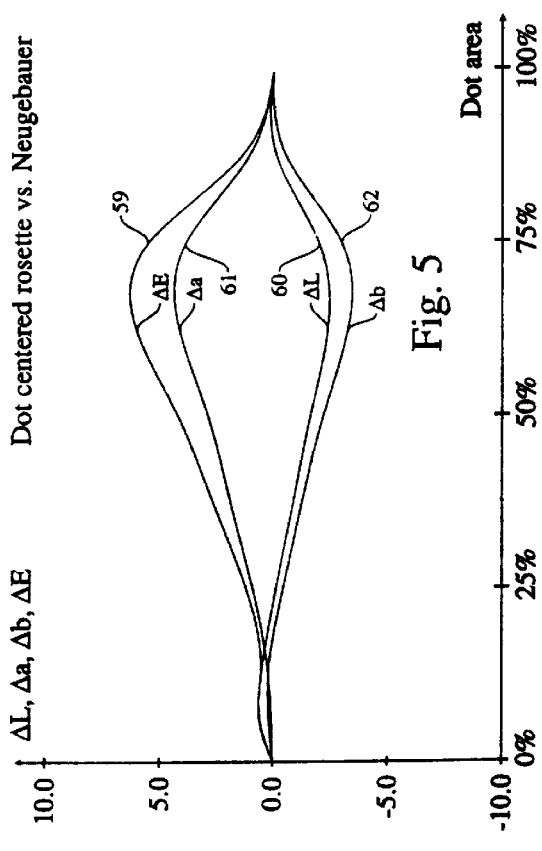

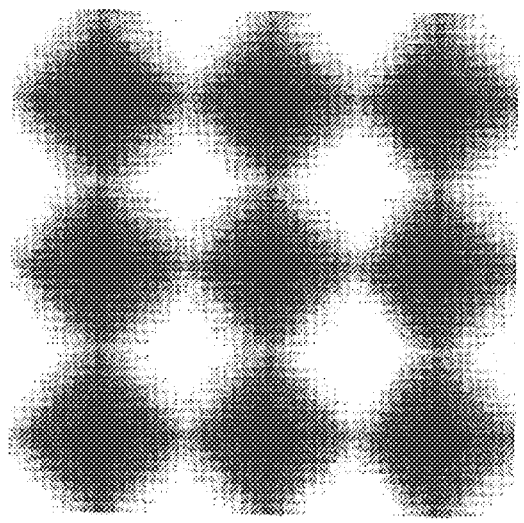
Fig. 7.a
Fig. 7.b
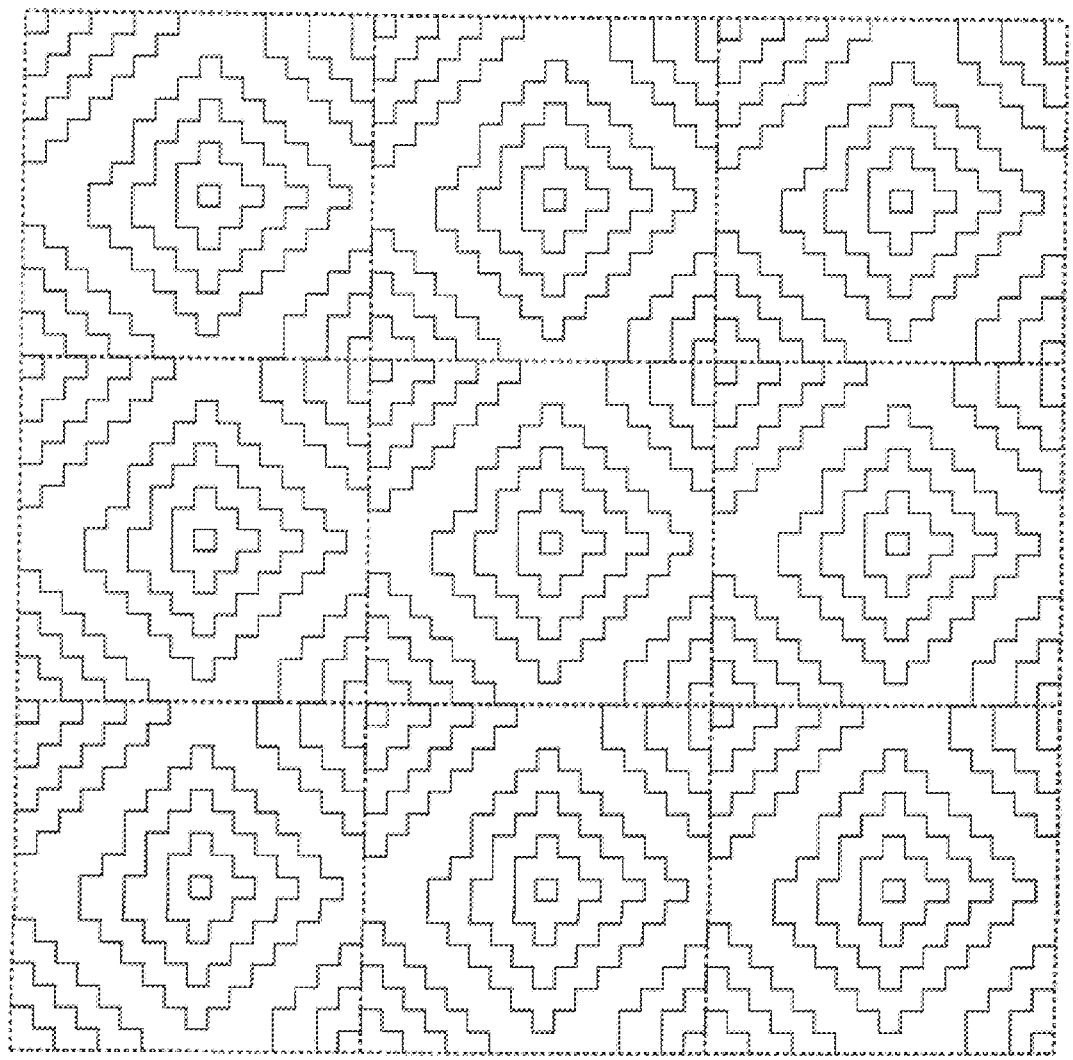
Fig. 7.c

Fig. 9

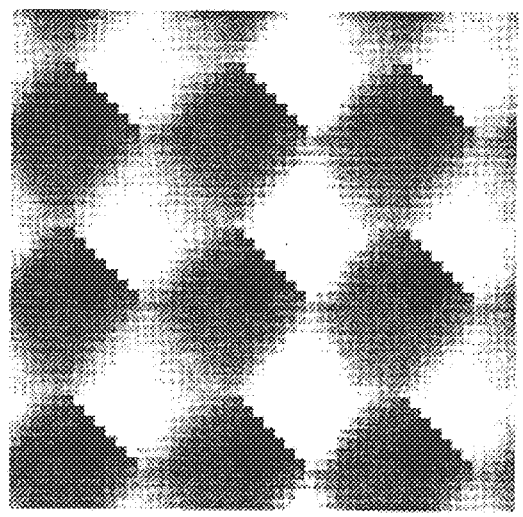
Fig. 10.a  Fig. 10.b
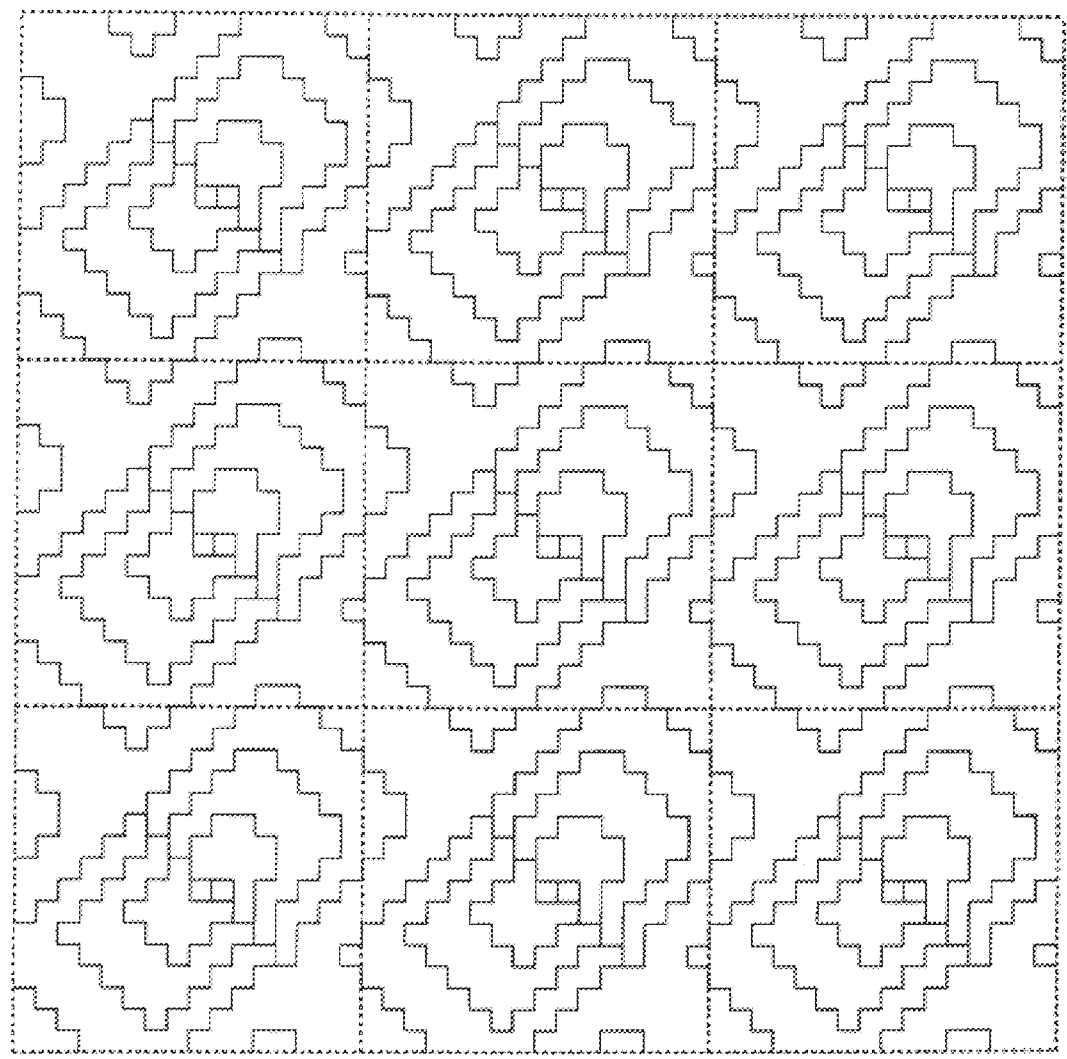
Fig. 10.c

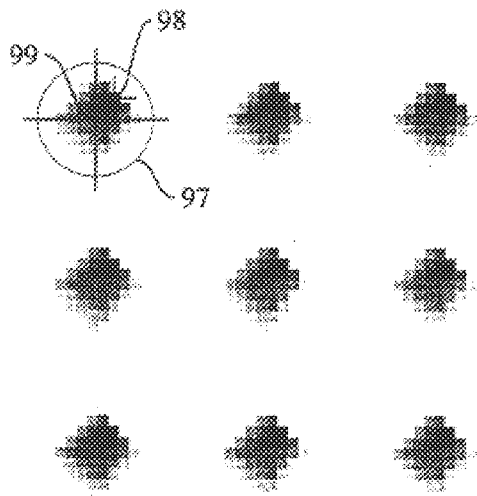
Fig. 11.a
Fig. 11.b
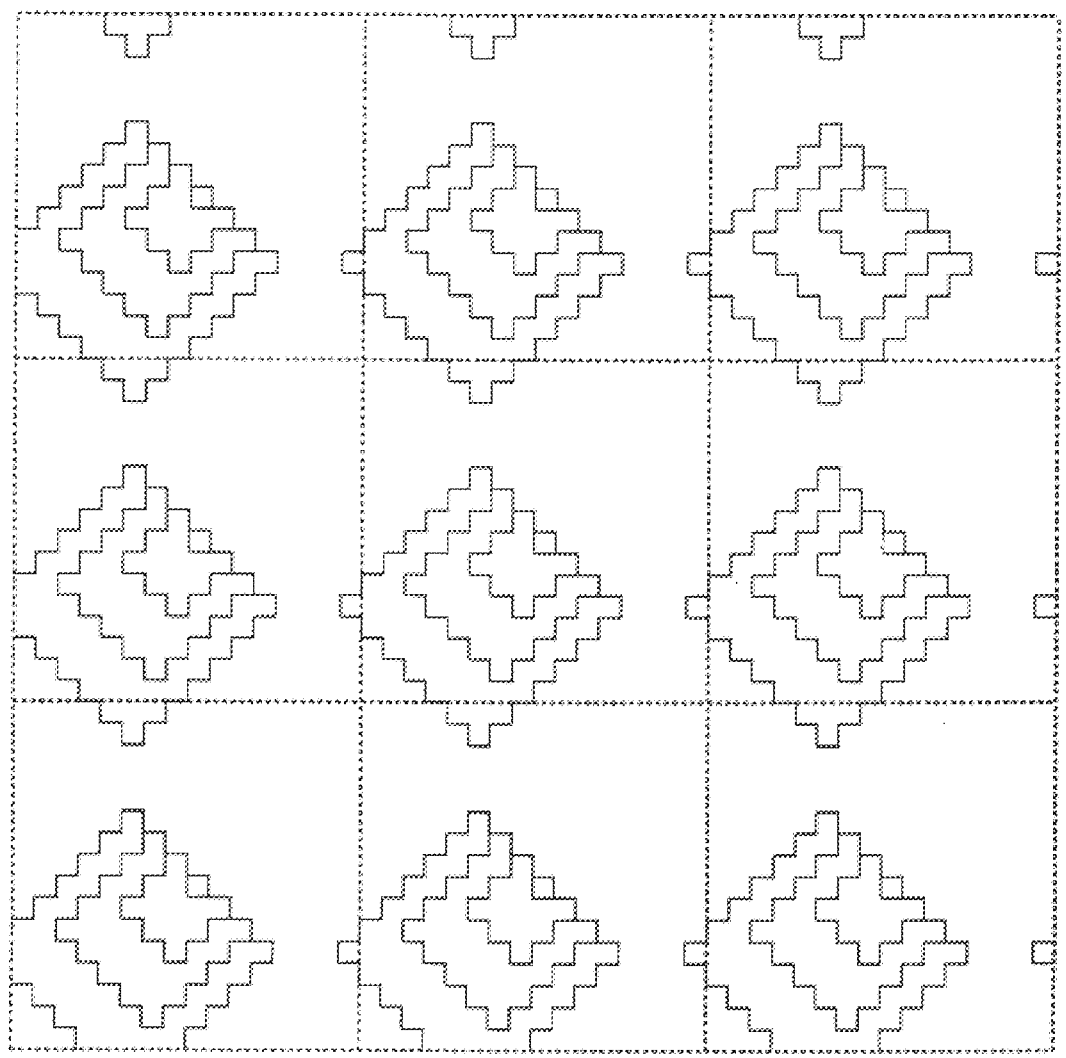
Fig. 11.c

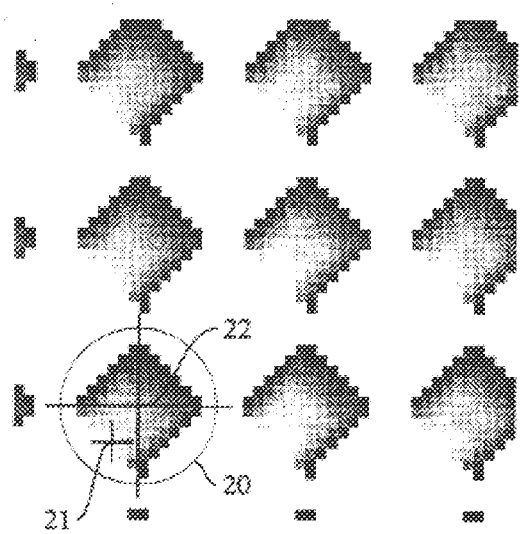
Fig. 11.d    Fig. 11.e
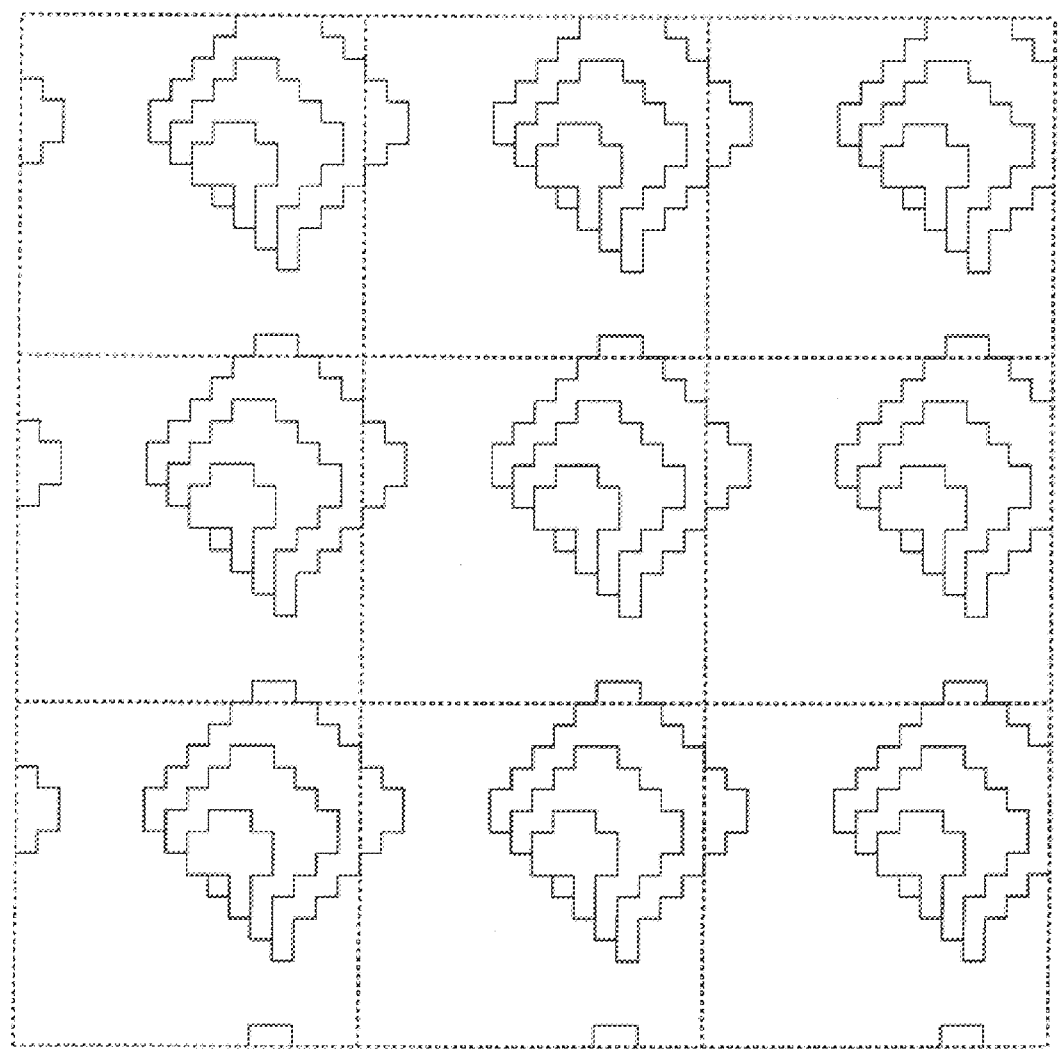
Fig. 11.f

PRINTING PLATE FOR A HALFTONE IMAGE HAVING TONER DEPENDENT ROSETTE STRUCTURES BV PHASE MODULATION

This application is a continuation of copending application Ser. No. 08/430,008, filed Apr. 27, 1995.

FIELD OF THE INVENTION

The present invention relates to the printed reproduction of images by means of halftoning and, specifically, to the reproduction of color-images by means of clustered dot halftones. The method of the invention is suited for use in image recorders producing halftone screens for printing presses.

BACKGROUND OF THE INVENTION

The rendering of color images in conventional offset printing is based on the principle of subtractive mixing. By combining different amounts of a set of primary inks (cyan, magenta and yellow), it is possible to reproduce a wide range of colors. A fourth ink, black, is usually added to support the printing of dark colors as well as text. The "conventional screening system" is characterized by the use of dot screens having equal frequencies, and having angles that are 60 degrees or multiples thereof offset with regard to each other. The goal of this rotation is to pseudo randomize the relative position of the halftone dots in the different separations, and to make the average amount of overlap between the dots—and hence the color balance—less registration dependent.

An analysis of this conventional screening system and some of its variations is described in U.S. Pat. No. 5,155,559, and in the article "Screening Techniques, Moire in Four Color Printing" (Delabastita P. A., TAGA Proceedings 1992 pp. 44–65). In these publications is explained that the rotation of the cyan, magenta and black screens in the traditional halftoning system does not introduce low frequency moire if the corresponding vector diagram forms a closed triangle.

If for some reason (for example angular misregistration) this is not the case, a low frequency moire will occur of which the angle and frequency are predicted by the opening in the triangle.

The analysis of the geometric interactions between screens by means of a vector diagram does not include the effects of the relative phase between the screens. FIGS. 2a and 2c demonstrate that this effect on the appearance of the screens should not be neglected. Both show a moire free combination of the same set of three screens, but with different relative phases with regard to each other. The "micro moire", commonly referred to as the rosette is totally different in both cases. The one in FIG. 2a is called "clear centered", as opposed to the other one (FIG. 2c) which is called "dot centered". Both rosette types have particular characteristics that are discussed in the following paragraphs. These characteristics relate to the "visual appearance" as well as to the "neutral balance" of color reproduction. The two extreme cases of relative positioning of the screens on top of each other are now discussed in relation with FIGS. 1a–1f. One of the strongest interference patterns appears when all screens have the origin of the carrier grids aligned, as shown in FIG. 1a. FIG. 1b shows three carrier grids placed on top of each other without spatial shift. The first carrier grid 31 has an orientation of 15° and is shown in bold lines. The second carrier grid 32 has an orientation of 45° and is shown in dotted lines. The third carrier grid 33 has an orientation of 75° and is shown in dashed lines. The center of each square within the carrier grid is the center where the clustered halftone dot starts growing. The origin of the three carrier grids 31, 32 and 33 is situated at point 34 in FIG. 1a. In FIG. 1c halftone dots covering about 9% of each carrier grid area are shown. This corresponds with the situation where all screens represent the same level above 0. The halftone dots are arranged at the respective centers of the carrier grid squares shown in FIG. 1b. The center point 35 in FIG. 1c corresponds with the origin point 34 in FIG. 1a. This point 35 will always be completely free of ink for any color that has three levels below 100% dot value. This type of screen is the one with clear centered rosettes.

The opposite configuration is shown in FIG. 1f, that can be understood from FIG. 1e. The configuration in FIG. 1e shows again three superimposed carrier grids. The first carrier grid 36 has an orientation of 15° and is shown in bold lines. The second carrier grid 37 has an orientation of 45° and is shown in dotted lines. The third carrier grid 38 has an orientation of 75° and is shown in dashed lines. The three carrier grids have an internal spatial shift of (0.5,0.5) as shown by the bold arrows in FIG. 1d. After rotation over the appropriate screening angles, the origin is located at point 39, where the centers of the carrier grid elements coincide for the three carrier grids. The center of a carrier grid square is the first spot to be rendered when the image level increases. The center position 39 in FIG. 1d corresponds with the dot point 40 in FIG. 1f. At point 40, the center of the dots collide. This point will be completely filled in right from the lowest dot percentage above 0%. This configuration shown in FIG. 1f is called the dot centered rosette.

Visual appearance of dot versus clear centered rosette.

The clear centered rosette is generally perceived as the least conspicuous one for the rendering of highlights. There are two explanations for this. As FIG. 1c and 1f show, a first reason is that the diameter of the smallest circle like structure is smaller for the clear than the diameter for the dot centered rosette, making the latter more visible. In the figure, the screen period is 10 mm for all three superimposed screens in both FIG. 1b and FIG. 1e. The diameter of the circle like structure in the clear centered rosette of FIG. 1c is 14.1 mm. The diameter of the circle like structure in the dot centered rosette of FIG. 1f is 20 mm. A second reason is that the halftone dots form a more correlated structure in the dot than in the clear centered rosette, and that therefore this structure is perceived as more disturbing. It is possible to mathematically describe the "amount of correlation" of both rosette patterns, and it would be found that the correlated structure of the dot centered rosette corresponds to the case in which all the fundamentals and harmonics that together produce the rosette pattern have exactly the same phase, while this is not the case for the clear centered rosette.

Since the clear and dot centered rosettes are each others phase opposite, similar conclusions can be made for the dark areas. The white spaces of the clear centered rosette will form the more correlated and disturbing structure in the dark areas, and the smallest white circle-like structure will be larger with the clear centered rosette.

Color balance with dot versus clear centered rosette

In order to study the color balance with the different rosette structures, only the colors with equal dot percentage values for the individual screens are considered. These colors define the equidensity axis. The percentage of covered paper along this axis has been recorded by computer simulation and is plotted in FIG. 3. In abscissa the percentage dot area is shown as a value ranging from 0% to 100%. In ordinate the percentage of covered area is shown, ranging from 0% to 100%. The curve 41 gives this function for dot centered rosettes. The curve 42 gives this function for clear centered rosettes. It is obvious that for both screening types nothing is covered for a dot percentage of 0% that corresponds to a white color on the paper. On the other hand, 100% is covered for a dot percentage of 100% that requires black on the paper. From curve 41, it can be seen that the dot centered rosette fills up the paper above 75% dot area for the separate screens, while the clear centered rosette leaves some major portion of the paper ink-free up to the dot area percentage of 100%. This can be understood in the context of the phase relations between the dots. The white portions of the paper are only saved by the three screens if they all produce white. Therefore this happens more often when these white portions are in phase, which is the case for the clear centered rosette in the shadows. The different amounts of paper coverage also indicate different amounts of dot overlap, which give rise to different colors with both rosette types. This is indeed what is observed in practical situations: neutral colors tend to be too magenta if the dot centered rosette is used and too green with the clear centered rosette. In the presence of moire, causing spatial variations between clear centered and dot centered rosettes independent from the image tone value, a low frequent component spatially oscillates between these two colors. A quantitative evaluation of this color difference was calculated by means of the Neugebauer equations and is explained in the next paragraph.

The printing with three inks and three halftone screens results theoretically in 8 possible combinations of ink overlap. The Neugebauer expressions predict the resulting color as a linear function of the colors of these combinations. The Neugebauer equation for the X tristimulus value in a three color printing process is:

$$X(c_1,c_2,c_3)=a_w X_w+a_1 X_1+a_2 X_2+a_3 X_3+a_{12} X_{12}+a_{13} X_{13}+a_{23} X_{23}+a_{123} X_{123}$$

The terms $x_{ijk}$ are the X tristimulus values of the corresponding overprints. If it is assumed that the relative positions of the halftone dots is random, the Neugebauer coefficients can be calculated from the Demichel equations that predict the fraction of each combination of the three inks as a function of their respective dot percentages $c_1$, $c_2$ and $c_3$. Instead of assuming that the dot positions of the three colors are randomized, it is also possible to calculate these coefficients by counting in a computer experiment the fractions of the different ink combinations obtained with the conventional screening system. This was done for both the clear and dot centered rosette. The three sets of Neugebauer coefficients were used to calculate the CIE XYZ values of the colors along the equidensity axis using the black, cyan and magenta primaries of the SWOP standard. FIG. 4 shows how the CIE Lab values of these colors as predicted for the clear centered rosette differ from the colors calculated from the Demichel equations. The figure also shows the psychometric color difference ΔE between the reference and the clear centered rosette as a function of the same dot area for the three colors. The color difference ΔE is composed of a difference in lightness ΔL, a difference Δa in red-green attribute value and a difference Δb in yellow-blue attribute value. These four differences ΔE, ΔL, Δa and Δb are shown as a function of the dot area percentage for clear centered rosettes respectively in curves 55, 56, 57 and 58. The color difference ΔE reaches a maximum value of 7 where every dot has a dot area percentage of 75%. A color shift towards green results, because Δa is negative, causing a shift towards green, and Δb is positive, causing a shift towards yellow.

FIG. 5 shows a similar plot, but for the dot centered rosette. This figure shows in curve 59 the psychometric color difference ΔE between the reference and the dot centered rosette as a function of the image level. Curve 60 shows the lightness difference ΔL, curve 61 the difference Δa in red-green attribute value and curve 62 the difference Δb in yellow-blue attribute value for dot centered rosettes. Also here, the color difference ΔE reaches a maximum for 75% dot area percentage. The maximum ΔE is 6, less than for clear centered rosettes. The color shift is towards magenta : Δa is positive, meaning a shift towards red, and Δb is negative, meaning a shift towards blue.

Both plots also show the difference in lightness ΔL between the predictions. The largest difference between the lightness calculated from the reference colors and the colors obtained with clear or dot centered rosette are found around the 75% dot value on the equidensity scale. Around this value, the clear centered rosette produces a color that is too light (L* too high) and too green (a* too low). The dot centered rosette produces colors that are too dark (L* too low), and too magenta (a* too high).

FIG. 6 shows the difference of CIE Lab values between clear and dot centered rosettes for equal dot percentages of the individual halftone images. It has been observed in practical situations that the rendering of neutral colors tends to be too magenta if a dot centered rosette is used and too green with a clear centered rosette. In the presence of moire, caused by e.g. angular mis-registration or frequency deviations between the separate screens, a low frequent component spatially oscillates between these two colors. The observed color differences can be as large as depicted in FIG. 6. Curve 51 shows the psychometric difference ΔE as a function of the dot area. Curve 52 shows the lightness difference ΔL, curve 53 the color shift Δa and curve 54 shows the color shift Δb.

It is clear from the above discussion that both the clear and dot centered rosettes produce objectionable structures in the shadows and highlights respectively. In addition does neither of them result in a color balance that is identical to the color balance obtained with a truly randomized halftone dot distribution.

OBJECTS OF THE INVENTION

It is a first object of the invention to have a screening system in which the rosette structure has minimal visibility in both the shadow and highlight areas.

It is a second object of the invention to have a screening system of which the color balance approximates the color balance with a randomized halftone dot distribution.

SUMMARY OF THE INVENTION

In accordance with the present invention, a screen is disclosed suited for the transformation of a continuous tone image into a halftone image, wherein said screen comprises a plurality of discrete spotlike zones having a density higher than a fixed density D, each of said zones having an internal region of maximal density $D_{max}$, the centroid point of said each spotlike zone not being situated within said internal region.

The choice of such a screen for a color reproduction can be used to induce a variable rosette structure depending on the intensity level of the original image and not depending on spatial oscillations caused by moire due to wrong alignment of the screens. By allowing the rosette structure to be variable as a function of the tone level, it is possible to minimize its visibility in both the highlight and shadow areas. At the same time it is possible to achieve a color balance that is nearly identical to that obtained with a truly randomized halftone dot distribution. A variable rosette structure can be obtained by making the phase of at least one of the screens tone dependent. Preferably the phase of all screens is made tone dependent. The phase is defined as the location of the centroid point of the halftone dots in the halftone image, relative to the position of the smallest halftone dots, as will be discussed below. In a preferred embodiment, it is advantageous to have clear centered rosette structures in the highlights and dot centered rosette structures in the dark areas.

The screen according to the invention can be used to produce individual halftone images. Preferably the screen is rotated over 60° for different components of the same image. These halftone images can be combined on a press to produce multi-tone images. Multi-tone images comprise duotone-images in which the same colorant is printed twice or two different colorants are used like black and grey or light and dark grey or grey and brown etc. Multi-tone images further comprise tritone images in which three colorants or inks are used or quadritone images etc. The colorants or inks can be different or the same; the inks can differ just by density variations or represent specific colors, e.g. for subtractive colors mixture or quadricolor printing.

The screen according to the present invention can be a photomechanical screen or its electronic equivalent, sometimes called a halftone mask. In theory, the electronic representation of a photomechanical screen can be obtained by sampling the photomechanical screen at the spatial resolution of the output device and with the density resolution in which the continuous tone image is given. A photomechanical screen corresponding to its electronic halftone mask can theoretically be obtained by printing on a photographic medium densities that are proportional to the electronic halftone mask values, at the same spatial resolution of the output device for the halftone image.

The tone values or densities of a screen vary according to a two dimensional screen function that takes the shape of a regular landscape with "mountains and valleys". For traditional ordered dither clustered dot halftoning, the tops of the individual mountains are arranged along a square grid, whereas the bottoms of the individual valleys are arranged along the center points of the square grid elements. For simplicity, we suppose that the shape of these mountains and valleys is pyramidical with a square base, giving square shaped halftone dots when a halftone image is produced using a screen having such pyramidal screen function. The halftone dots result from a thresholding operation. For photomechanical screening the light reflected or transmitted by the continuous tone image is transmitted through the photomechanical screen. This screen attenuates the light according to the local density of the screen where the light impinges. The attenuated light illuminates a photographic material wherein the photographic elements develop only if the attenuated light has a level above a fixed threshold. In electronic screening this process is simulated by representing both the image densities and screen densities electronically by digital values, by reducing both the continuous tone image information and the screen mask at the resolution of the marking engine, and subtracting the image pixel values from the screen mask values. If the result is greater than zero, a black micro dot is set, otherwise the corresponding position is left transparent or white. Black micro dots are clustered to what is called halftone dots. The clustering is obtained by the appropriate arrangement of the screen. The size of the halftone dot is determined by the intensity level that must be obtained. The magnitude of the intensity level corresponds with the vertical location of a horizontal plane cutting the top of the mountain. For a high intensity level, the horizontal plane is located higher than for a low intensity level. The former case gives a smaller halftone dot than the latter case. All the points within the halftone dot correspond to points where the mountain is higher than the cutting plane. In this traditional symmetrical case, a small halftone dot corresponding with a higher intensity level will be symmetrically positioned within a large halftone dot corresponding with a lower intensity level. The centers of both small and large square halftone dots will coincide. Moreover, the common center coincides with the location of the top of the mountain.

For a screen according to this invention, the centers of smaller and bigger halftone dots corresponding with different intensity levels do not coincide. The center of the halftone dot corresponding with the highest intensity coincides with the location of the mountain top. As the intensity decreases, the horizontal plane cuts larger tops from the mountain, whereby the base of the top above the plane increases. The center of this base shifts also away from the initial location of the mountain top.

For halftone dots having a square shape, it is straight forward to define where the center of the square is located: at the intersection of the two diagonals. If the halftone dots have an irregular shape, e.g. due to finite resolution of micro dots that add discrete spots—called micro dots—to the halftone dot as the intensity level decreases, the halftone dot center $(X_0, Y_0)$ is defined as the centroid of all points $P_i$ having individual centers $(X_i, Y_i)$ making up the halftone dot. These centroid points shift away from the top position as the intensity level decreases.

As soon as the halftone dots connect, it is difficult to state from which points $P_i$ the centroid must be obtained. However, as soon as the dot holes—corresponding to the screen function "valleys"—disconnect, the centroids of the dot holes can be computed, and compared to the position of the centroid of the hole corresponding with the lowest intensity level. For decreasing intensity levels, the centroid of the halftone hole will approach the position of the bottom of the valley. It is also possible to define the position of the centroid point of a black halftone dot as the center point of the quadrilateral formed by the centroid points of the four closest halftone holes. The shift of the halftone dot center or centroid causes a different rosette structure when the screens of the different color components are printed on top of each other.

A halftone image obtained by electronic screening typically consists of a bitmap to be imaged on micro dots that are uniquely addressable by the marking engine that produces the image on a physical carrier. A carrier can be a sheet of transparent or opaque photographic material or a piece of paper written e.g. by an electrophotographic process, by a thermal process such as thermosublimation, thermal transfer, or it can be a printing plate capable of carrying a halftone image. A photomechanical screen having the properties corresponding to the current invention can also be used to convert a continuous tone image on to a halftone image by a photomechanical process.

The screen, the method to use it and its advantages will become clear from the detailed description of some examples according to the current invention below.

DETAILED DESCRIPTION OF THE INVENTION

The invention is described hereinafter by way of example with reference to the accompanying figures wherein:

FIGS. 1a–1f illustrate dot centered rosette and the clear centered rosette obtained by relative placement of the three carrier grids;

FIGS. 2a–2c illustrate a grey wedge showing a clear centered rosette, a variable rosette and a dot centered rosette structure;

FIG. 3 is a graph displaying the percentage covered by the three inks as a function of the halftone dot area percentage;

Figure 8:
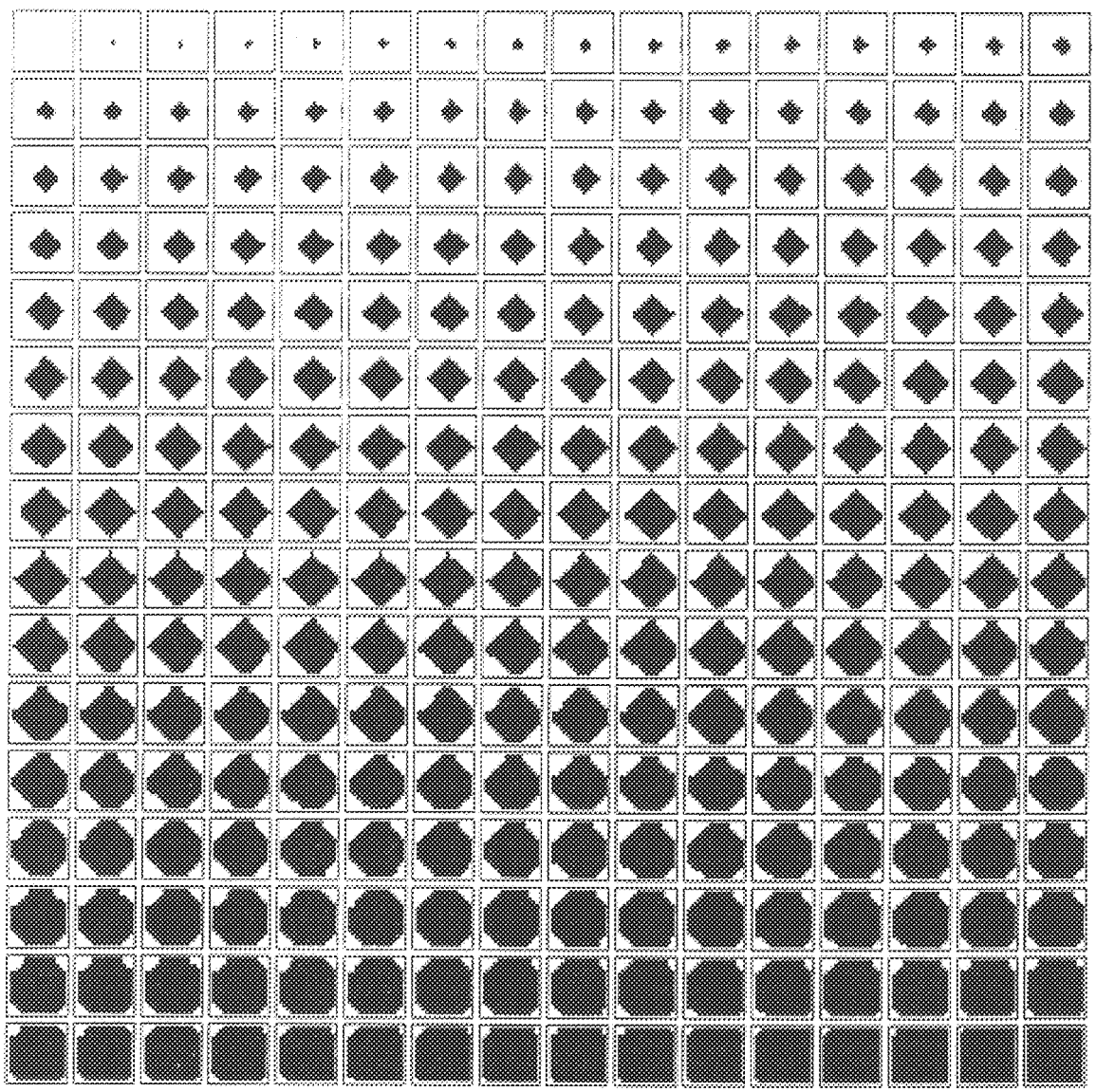
Figure 12:
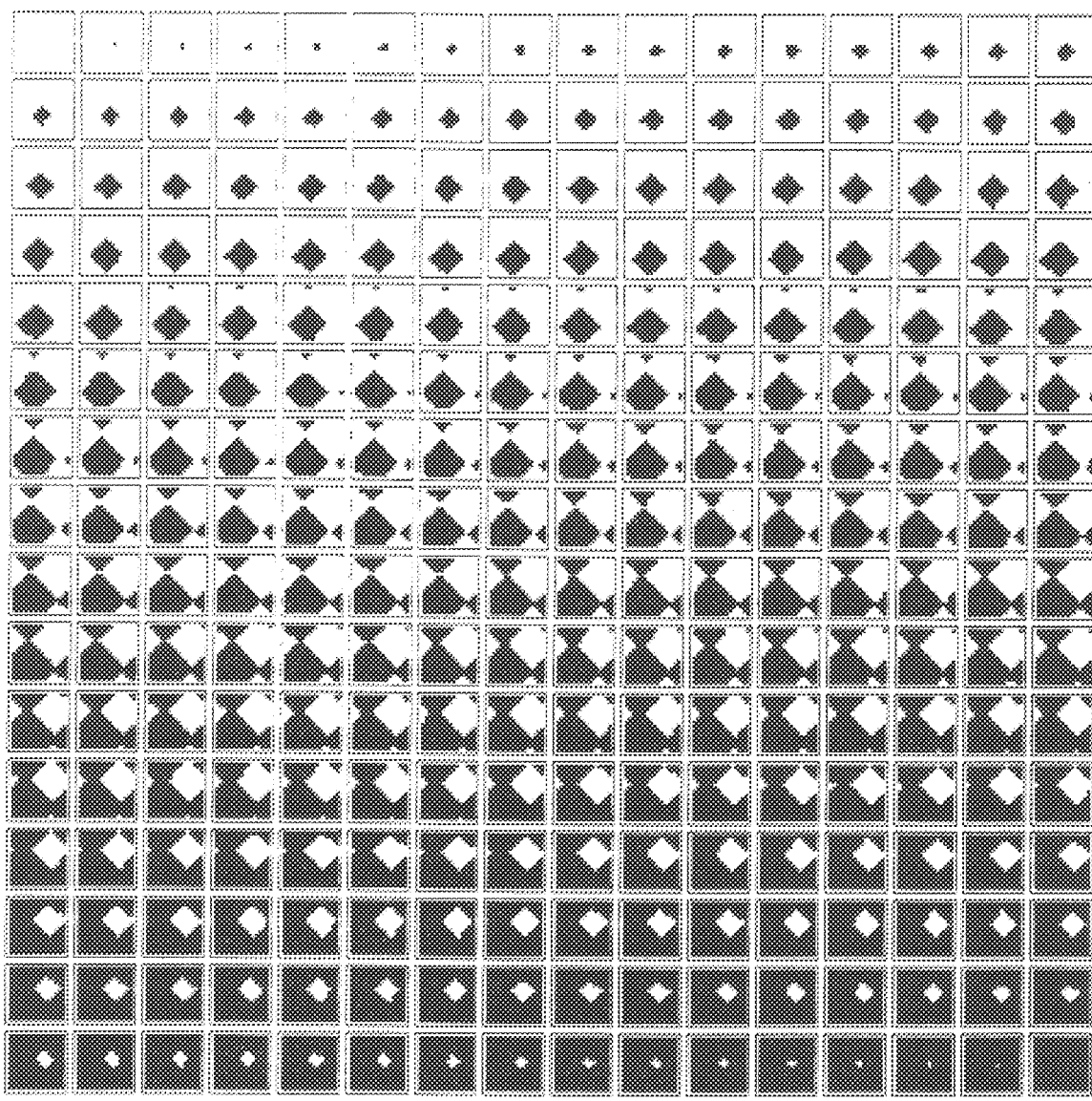
Figure 13:
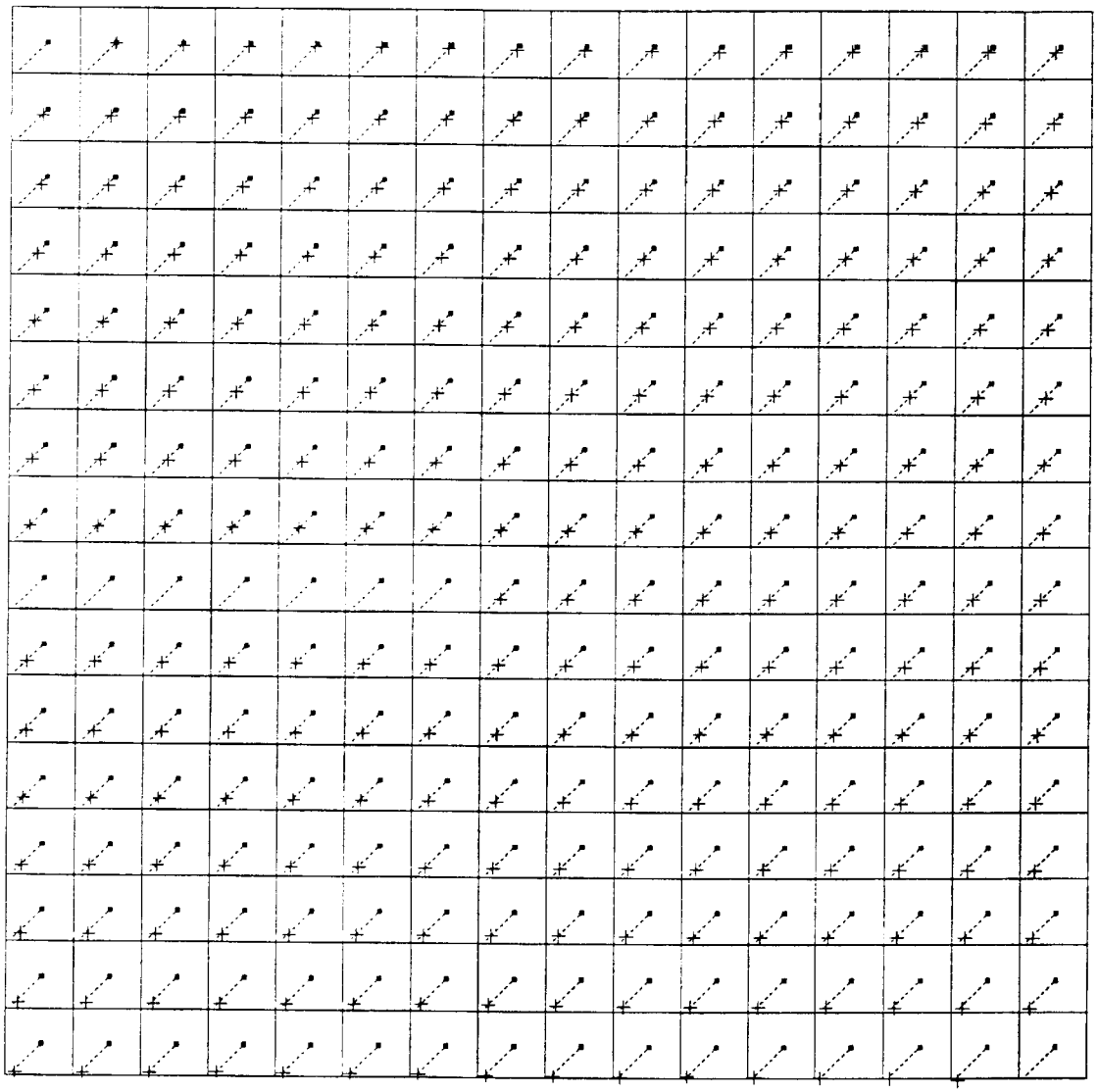
Figure 14:
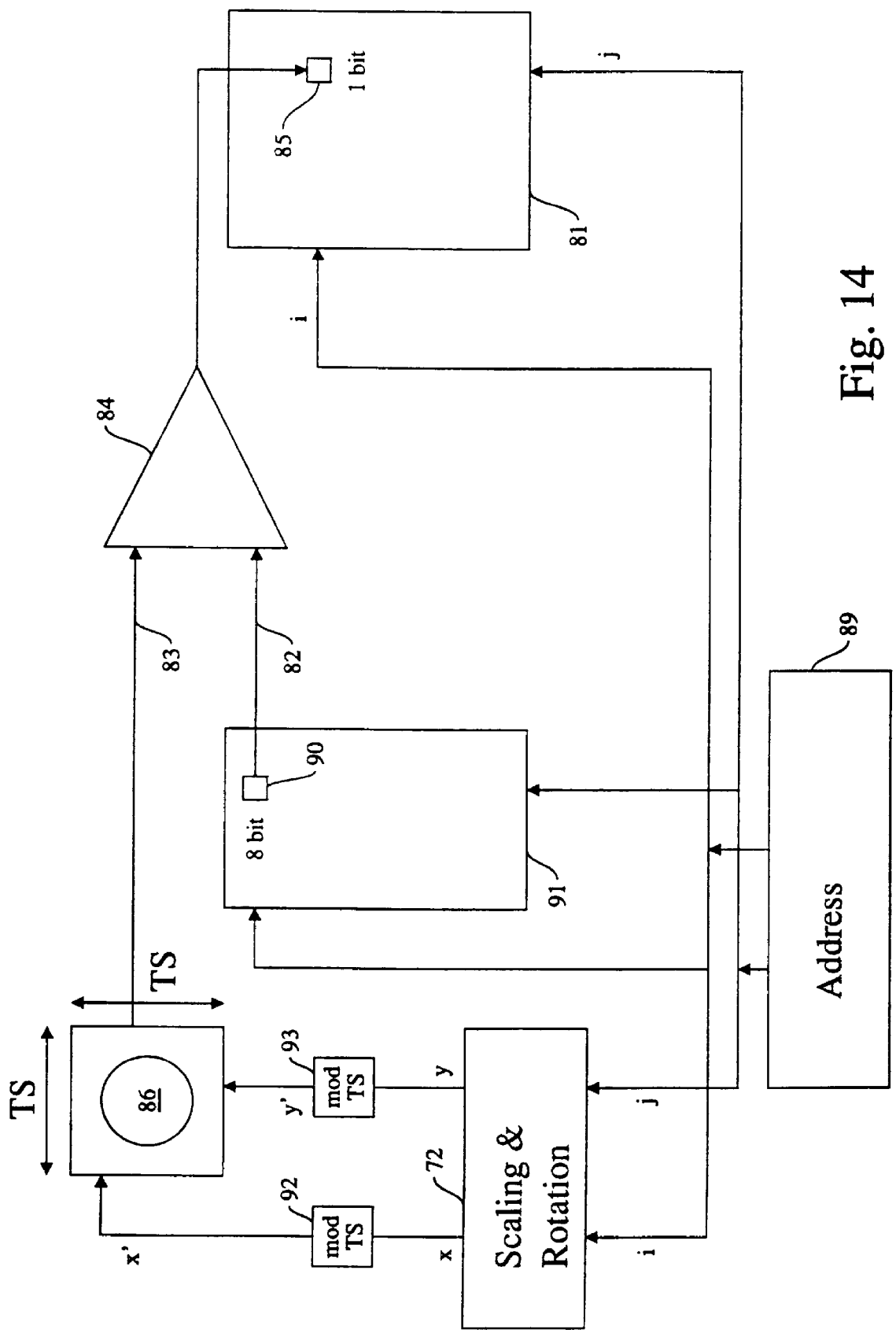
Figure 15:
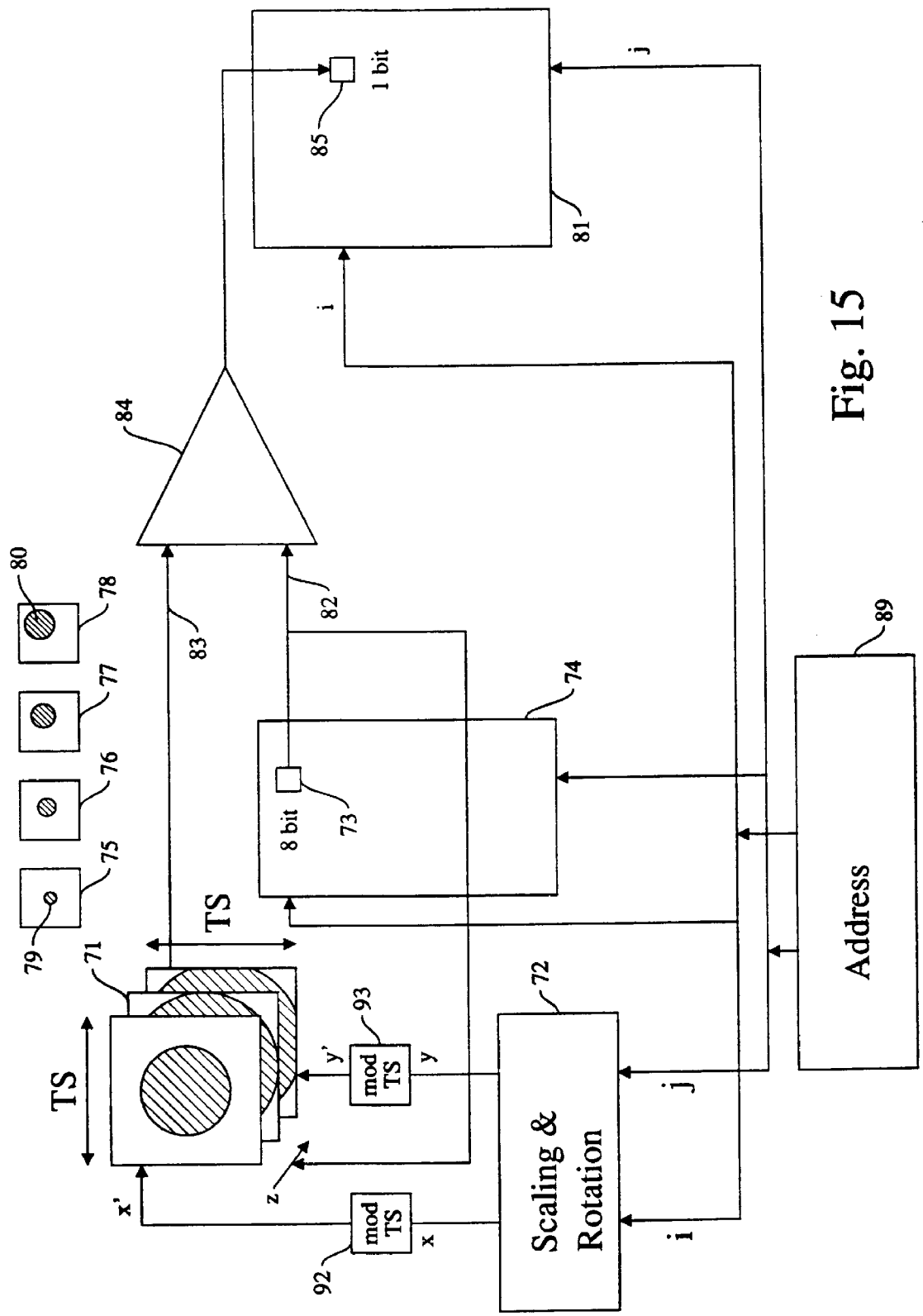
Figure 16:
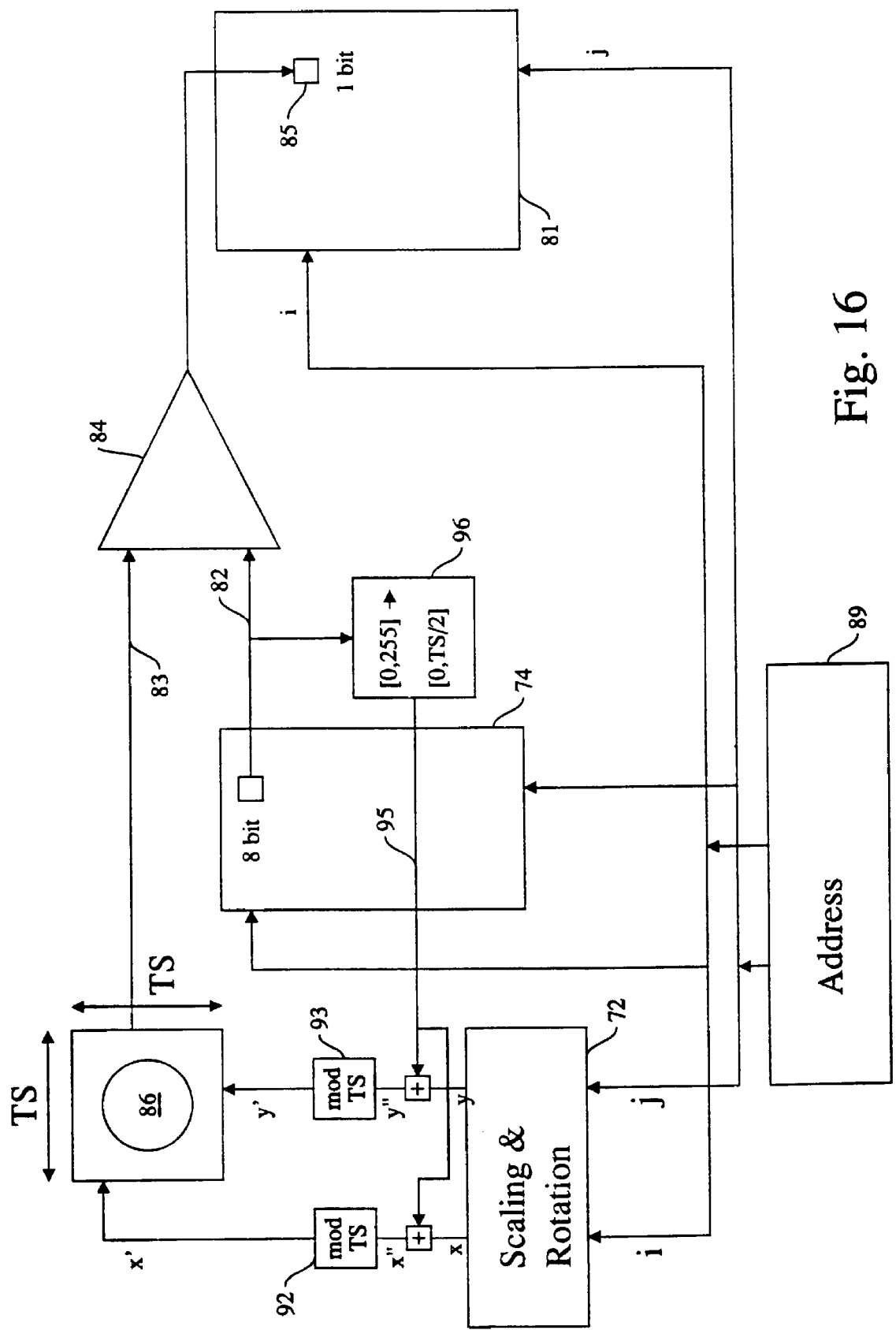

FIG. 4 displays the color shifts introduced by clear centered rosettes;

FIG. 5 displays the color shifts introduced by dot centered rosettes;

FIG. 6 displays the color shifts between the extremes of dot and clear centered rosettes;

FIGS. 7a–7c illustrate a traditional halftone screen together with lines delineating points below or above a fixed density level;

FIG. 8 displays the halftone dot growth for an image screened by the traditional screen shown in FIGS. 7a–7c;

Figure 9:
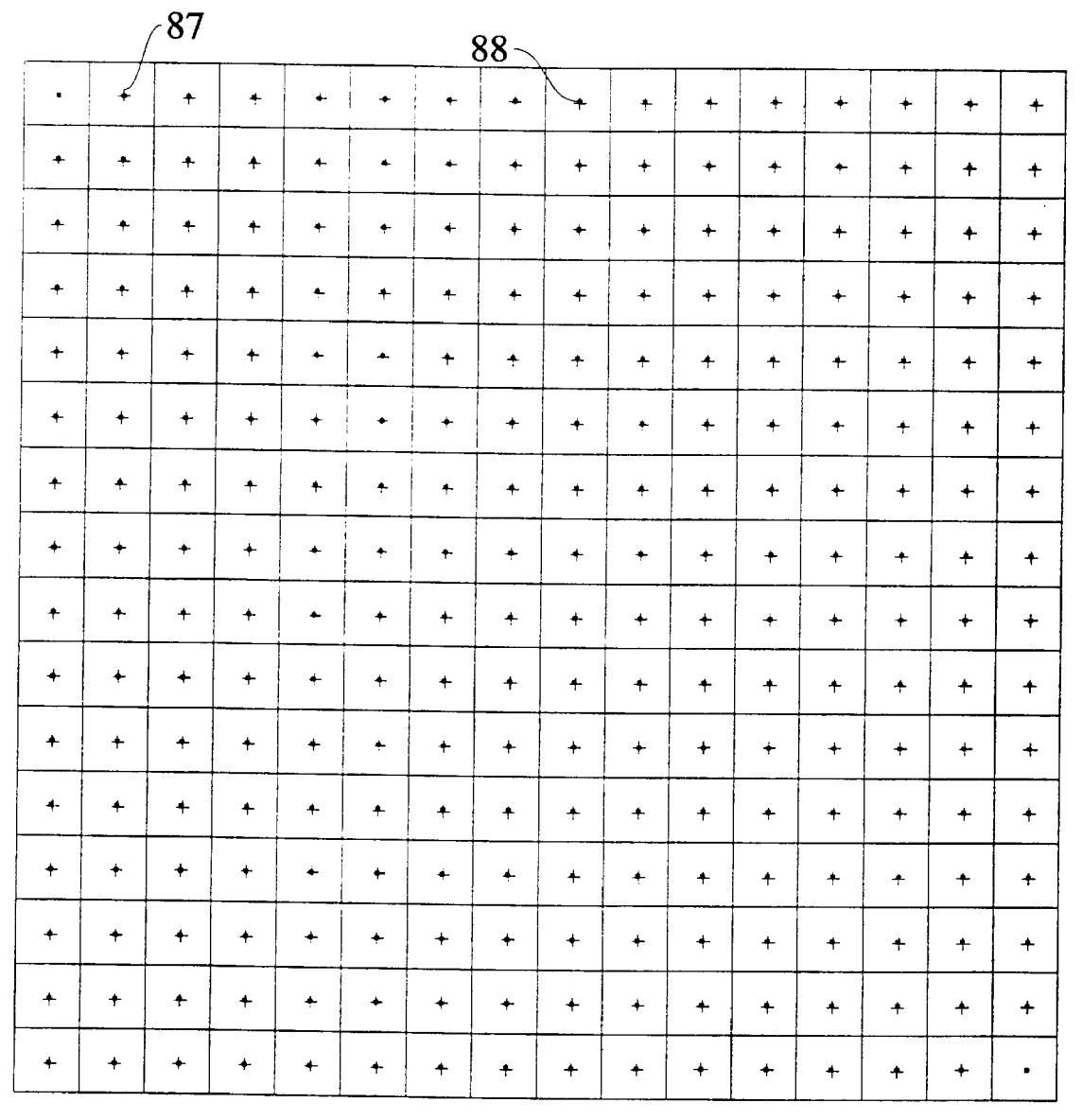

FIG. 9 displays the position of the centroid point for the halftone dots shown in FIG. 8;

FIGS. 10a–10c display a halftone screen according to the invention together with lines delineating points below or above a fixed density level;

FIGS. 11a–11c display spot like zones having a density above a fixed density D and the lines delineating black halftone dots only;

FIGS. 11d–11f display spot like zones having a density below a fixed density D and the lines delineating white holes;

FIG. 12 displays the halftone dot growth for an image screened by the screen according to the invention shown in FIGS. 10a–10c;

FIG. 13 displays the position of the centroid point for the halftone dots shown in FIG. 12;

FIG. 14 shows a block diagram for an electronic system making use of the screen according to the current invention;

FIG. 15 shows an alternative block diagram to obtain a halftone image with shifting centroid;

FIG. 16 shows a third block diagram suitable for the construction of a halftone image with shifting centroid.

In the above discussion, the effect of the rosette has been discussed on both the visibility of its structure, and on color balance. It was shown that the clear centered rosette is less visible than the dot centered rosette in the highlights, and that the opposite is true in the shadows. An ideal screening system is not necessarily based on one or the other kind of rosette. We have found that a better solution consists of making the rosette tone dependent. In addition enables a variable rosette structure to approximate the color balance as predicted by the Demichel equations more closely.

FIG. 2b shows a degrade in which the rosette is clear centered in the highlights, and dot centered in the shadows. Since the nature of the rosette is dependent on the relative phase of the screens, a tone dependent rosette can be achieved by making the relative phase of the halftone screens tone dependent. A rosette structure that changes from "purely clear centered" to "purely dot centered", can be obtained for example by shifting just one or each of the three screens that make up the rosette over half a period along both directions of their respective screen angles. FIG. 1d shows that for a 45° screen, this shift can be realised by a vertical translation over 0.707 times the screen period. This shift is composed of a translation over both half a period along the 45° axis and a translation over half a period along the 135° axis, as indicated by the bold arrows.

FIG. 1a shows the relative position of the coordinate systems of three halftone screens in the highlights. If by convention the origins are associated with the white spaces in the halftone screens, this configuration will correspond to a clear centered rosette. FIG. 1d shows the relative position of the coordinate system of the same screens in the shadow areas. The origins have been shifted by half a period in the direction of both the orthogonal components of the corresponding screen angle. We have to accomplish a maximum shift of the center of (0.5,0.5) along the internal diagonal in order to obtain the two extreme opposite dot configurations for the minimum and maximum image levels. We will show that for a diamond shaped dot, this requirement can be accomplished by having the middle of one of the sides of the growing rectangle aligned with the carrier grid as depicted in FIG. 11b.

In FIG. 7a we show three by three periods of a traditional pyramidal screen. The halftone dots that will result from such a screen have a diamond shape, as is clear from FIG. 7b and FIG. 7c. In FIG. 7b, we displayed the screen mask that corresponds to the screen shown in FIG. 7a. Lines delineating levels at both sides of a fixed level are also shown in FIG. 7b. The fixed levels we have chosen are 0.5, 11.5, 38.5, 81.5, 172.5, 216.5, 243.5 and 254.5. As can be seen in FIG. 7b, all level lines corresponding to a level well below 128 close around the center point of the cell. This is also clear from FIG. 7c. The lines corresponding to levels higher than 128 close over other cells, as can be seen in FIG. 7c. The first type of lines delineate black halftone dots, while the second type delineates halftone holes. As soon as the fixed level is high, the black halftone dots will start to connect over all cells. As soon as the fixed level grows higher, the halftone holes disconnect and form clustered dots over the cell boundaries.

In FIG. 8 is illustrated how the black halftone dot on a screened image grows with the density level for a traditional screen shown in FIG. 7a. It is clear that the "position" of the halftone dot stays essentially the same for every size.

In FIG. 9 we give a plot of the position of the halftone dot center for the halftone dots shown in FIG. 8. To compute the position of the center or the centroid for a halftone dot composed of two micro dots, the center position coordinates of the two micro dots are added and divided by two. More generally, for N micro dots forming the halftone dot, the $X_i$ values for the position $(X_i,Y_i)$ of dot i for i=1 . . . N are added and divided by N, giving $X_c$ and the $Y_i$ values are added and divided by N, giving $Y_c$. The N microdots belonging to one halftone dot can be uniquely identified as long as the microdots of different halftone dots do not connect. We say that two micro dots connect if they touch each other with at least one side. If two micro dots belonging to two different halftone dots touch just by a corner, it is still possible to determine to which halftone dot each micro dot belongs. That way it is possible to find the centers for level 1 to 127.

In an analog way, the centers for the white halftone holes can be identified as the centroid of the micro dots that are left blank. As long as the number of blank micro dots within a halftone hole is relative small, it is possible to determine to which halftone hole the blank micro dots belong. We use the same rule to find out whether the blank micro dots touch over halftone holes. As such, we can compute the center for levels 254 to 129.

To show how the center of the black halftone dots vary over the whole range 1 . . . 254, we must find an acceptable definition for the center location of the black halftone dot when it is connected with other black halftone dots. Therefore we define it as the center point of the centroids of the four closest white halftone holes. In a square carrier grid this corresponds to the centroid position of one of the four closest halftone holes, shifted along the diagonal of the square over half the length of the diagonal.

As can be seen from FIG. 9, the centroid points for subsequent larger sized halftone dots, indicated by a cross 87, stay within or close to the central micro dot indicated by the square 88. FIG. 9 thus clearly illustrates that the "phase" or relative location of the centroid point with respect to the carrier grid of the halftone dots is constant, for all input levels or for all sizes of the halftone dot.

FIG. 10a shows a halftone screen according to the current invention. It looks more asymmetrical than the screen shown in FIG. 7a, although also here the halftone dots will have a diamond shape. FIG. 10b shows the numeric representation corresponding to the halftone mask shown in FIG. 10a. Also here lines of equal level are drawn, at level values 0.5, 12.5, 40.5, 84.5, 170.5, 214.5, 242.5 and 254.5. The shape of these lines can be appreciated in FIG. 10b, along with the numeric values. In FIG. 10c several cells were put side to side, such that the connection of level lines crossing the cell boundaries can be appreciated.

In FIG. 11a it is clearly visible that the screen as shown in FIG. 10a comprises a plurality of discrete spotlike zones 97, having a density higher than a fixed density D. For D we selected a density that corresponds with threshold value 41 in the corresponding halftone mask. All spots of FIG. 10a with a density not higher than D were blanked out in FIG. 11a to show only the spotlike zones 97. Each of these zones 97 have an internal region 98 of maximal density $D_{max}$. This region corresponds with the location where the corresponding halftone mask has value 0. The centroid point of the spotlike zone 97 is marked with a cross 99. It is clear that the centroid point 99 is not located within the internal region 98 of maximal density $D_{max}$. Moreover, it can be seen from FIG. 11b or 11c that the centroid point for a larger zone, e.g. containing all points with threshold values 0–84, is located further away from the internal region of maximal density 98.

In FIG. 11b we show the level lines delineating black halftone dots apart. These lines all close around the central point with numeric value 0. In FIG. 11c the periodicity of the structure is shown, illustrating that the halftone dots are connected over cell boundaries. It is clear from FIG. 11c that the halftone dots, delineated by the level lines, are isolated. It is also possible to draw a carrier grid of horizontal and vertical equally spaced lines such that every halftone dot is situated completely within one grid element or halftone cell. It is clear that a small halftone dot will be situated somewhere in the center of the first quadrant of such halftone cell, while the biggest isolated halftone dot will have its center of gravity right in the center of the complete halftone cell. From FIG. 11c it is thus clear that the relative position of the centroid point of the halftone dot within the halftone cell depends on the size of the halftone dot. From FIG. 13 it will become clear that the centroid point moves along the diagonal line of the halftone cell towards the corner of the halftone cell as the size of the halftone dot increases. When the area of the halftone dot is small, the distance between the top right corner of the halftone cell and halftone dot center is 0.707 times the cell size. When the area of the halftone dot is bigger, also the distance between said corner point and the dot center increases.

In FIG. 11d it is clearly visible that the screen as shown in FIG. 10a comprises a plurality of discrete spotlike zones 20, having a density lower than a fixed density D. For D we selected that density that corresponds with threshold value 170 in the corresponding halftone mask. All spots of FIG. 10a with a density not lower than D were blanked out in FIG. 11d to show only the spotlike zones 20. Each of these zones 20 has an internal region 21 of minimal density $D_{min}$. This region corresponds with the location where the corresponding halftone mask has value 255. The centroid point of the spotlike zone 20 is marked with a cross 22. It is clear that the centroid point 22 is not located within the internal region 21 of minimal density $D_{min}$. Moreover, it can be seen from FIG. 11e or 11f that the centroid point for a larger zone, e.g. containing all points with threshold values 171–255, is located further away from the internal region of maximal density 21.

In FIG. 11e we show the level lines delineating white halftone holes. They all close around the central point with numeric value 255. In FIG. 11f the periodicity of the structure is shown, illustrating that the halftone holes are connected over cell boundaries. From FIG. 11f it is clear that the halftone image can comprise isolated low density halftone dots. For regions in the image with a high density, these low density halftone dots or halftone holes will become visible and have the shape as delineated by the level lines in FIG. 11f. A carrier grid comprising horizontal and vertical equally spaced lines can be constructed such that each halftone hole completely falls within one halftone cell formed by the carrier grid. It is also clear that the centroid point of the halftone hole substantially changes from position within the halftone cell as the area of the hole increases. Preferentially, said centroid point moves towards a corner of the halftone cell, in FIG. 11f more specifically the upper right corner. The distance between the centroid point and the lower left corner of the halftone cell increases as the area of the halftone hole increases. The distance here is measured towards the lower left corner of the cell, where as it was measured towards the upper right corner for the high density halftone dot. Both corners are situated on one diagonal line.

FIG. 12 shows how the halftone dot on an image screened by a screen according to the current invention grows from lowest dot percentage to highest. The shape is like the diamond shape in FIG. 8, but the center of the halftone dot shifts towards the lower left corner of the cell.

In FIG. 13 the centroid position of the halftone dot is shown for subsequent halftone dot sizes. The centroid is defined in the same way as was done in conjunction of FIG. 9. It is clear that the centroid point indicated by the plus ("+") on FIG. 13 coincides with the center of the carrier grid cell for small halftone dots—corresponding with high image levels—and that the centroid point shifts towards one of the corners of the carrier grid cell, along the diagonal of the cell for increasing density of the cell.

A screen giving diamond shaped halftone dots can be constructed by respecting following considerations. We suppose that the cell has corner points (−1,−1), (1,−1), (1,1) and (−1,1) and cell center (0,0). If the centroid for a 0% halftone dot must coincide with the center of the cell (0,0) and the centroid for a 100% halftone dot must be located at (−1,−1), then a 50% halftone dot must have its centroid point at (−0.5,−0.5). Not only for the diamond shaped but for most halftone images, a 50% halftone dot is a square having an area that is half the area of the complete halftone cell. It must be oriented such that the four corner points of the halftone dot touch a corner point of the neighbouring halftone dots. These considerations make clear that the 50% halftone dot is a square having its center at (−0.5,−0.5), the middle of one side going through (0,0) and the middle of the opposite side going through (−1,−1). Because on the other hand a 50% halftone dot comprises all micro dots of a <50% halftone dot, the micro dots for a halftone dot of <50% must be selected from the dots situated at the lower left side of the line (−1,1) tot (1,−1). This gives the impression that the center (0,0) of the halftone cell is always at the right side of the halftone dot. The halftone holes can be constructed in a way symmetrical to the halftone dots.

Although we have given an example of a screen resulting in diamond shaped halftone dots and halftone holes on the screened image, the invention is not restricted to this shape. Also a round, elliptical or whatever halftone dot shape can be used as a basis for this screen. Difficulties might arise when the dot shape does not have the symmetry of the rectangular grid itself. However, a similar center shift can be obtained by allowing a small deformation of the original dot shape. The requirement is that the center of the halftone dot remains in-the growing dot for all halftone dots. The following statements describe the approach to be taken when subsequent halftone dots are tailored.

In order to get a screen according to the current invention, the shift is made along or parallel to an internal diagonal. As in the example above, the (−1,−1) diagonal can be chosen. While the halftone dot is growing, the center shifts from (0,0) to (−1,−1). To obtain a screen according to the current invention one selects additional micro dots which are connected to the existing halftone dot to increase the halftone dot size. The maximum length of the shift from (0,0) to (−1,−1) is $2^{1/2}$. For a recording system capable of rendering images with a density precision of eight bits, a cell can be thought to consist of 256 micro dots arranged in sixteen lines and sixteen columns. The maximum shift of $2^{1/2}$ expressed in micro dots would be $16/2^{1/2}=11.31$. A linear shift comprises a shift of this maximum distributed over 256 pixels and hence represents a distance of 11.31/256=0.044 micro dots for each grey level.

Introduction of the maximum shift for all three screens, results in a clear centered rosette in the highlights and a dot centered rosette in the dark areas. The image in FIG. 2b shows the smooth shift of the centers for increasing density. It can be seen that the interference pattern changes gradually along the grey wedge. This phenomenon is controlled by the image grey level and is therefore completely different from the periodical moire that occurs as a side effect of badly chosen screens. It is most obvious that a smaller shift will result in a more limited number of rosette structures along the grey scale.

It will now be explained in detail which methods are available to incorporate the tone dependent phase shift in three of the most representative halftone generators.

A first representative of a halftone generator is shown in FIG. 14, and is based on comparing in a comparator 84 at every position or address (i,j) of the recorder grid 81 the contone pixel value 82 with a screen function value 83. Depending on the outcome, the recorder element or micro dot 85 is turned "on" or "off". The screen function values 86 can be calculated on the fly or can be pre-stored in a matrix. The latter method is used in the PostScript interpreters offered by Adobe Systems Inc. The description of the screen period in that case is called a "spotfunction". A limitation compared with the next three dimensional method of FIG. 15 is that in this case larger dots are always built on top of smaller dots. This slightly limits the freedom to change the shape and position of the halftone dots as a function of the tone level. A tone dependent phase shift however can be obtained by making use of a special screen function that changes the position of the dot center as a function of the dot area. In FIG. 10b an example of one period of such a screening function was shown. This is a screening function giving a diamond shaped dot for a screen with an orientation of zero degrees and a screen ruling of sixteen times the recorder or micro dot resolution.

The condition that every smaller dot has to be contained in a larger dot results in a restriction on the amount of phase shift that can be achieved and on how the phase shift should be programmed as a function of the dot area. The exact relation depends also on how the dot shape varies as a function of the dot area. A very simple spotfunction produces square dots like in FIG. 10c, 11c and 11f. The amount of shift of the dot center can be expressed as a function of dot area A and is shown in FIG. 13 in conjunction with FIG. 12.

Most spotfunctions for application in offset printing produce dot shapes that grow symmetrically from 0 to 50% dot percentage up and from 100% to 50% down. The spotfunction of a diamond shaped dot without phase shift is given by:

$$\text{spotfunction}(x,y)=1-(abs(x)+abs(y))$$

This function takes the value 1 in the origin (0,0) which is the center of the cell. It takes the value −1 in the corner points (−1,−1), (−1,1), (1,1) and (1,−1), and values between 1 and −1 elsewhere in the normalised cell. The lines of equal function value are oriented 135° in the first and third quadrant and 45° in the other quadrants. As such, they delineate a diamond around the origin.

A spotfunction that can be used to generate a screen according to the current invention can be generated by the following PostScript code. The input values are (x,y) within the normalised cell, the output is a value between −1 and 1, as is prescribed by the PostScript Reference Manual.

First the axes (x,y) are rotated over 45° to obtain (xp,yp). A scaling factor of $2^{1/2}$ is introduced to reduce computational complexity:

$$xp=x+y$$

$$yp=y-x$$

Every function value at the left side of the yp axis (xp<0) is made positive. Every function at the right side has the same absolute value as its mirror point about the yp axis, but the opposite sign. The positive function value is:

$$\text{spotfun}=1-max\ (|xp|/2,\ |yp|)\ |x|=abs(x)$$

All lines of equal function value start at the yp axis, run parallel to the xp axis and close over a line parallel to the yp axis. The lines of equal function value are chosen such that they form a square when taken together with the yp axis. The cell center (0,0) is right in the middle of the two lines parallel to the xp axis.

As soon as yp is outside [−1,1](|yp|>1), the function must be evaluated relative to neighbouring cells. The details will become clear from the following PostScript code fragment.

```
/spotfunction
{
dup            % x y y
2 index        % x y y x
sub            % x y y-x=yp
3 1 roll       % yp x y
```

-continued

```
add                    % yp x+y=xp
dup                    % yp xp xp
0 gt { 1 } { −1 }      ifelse % yp xp sign : if x > 0 sign=1 else −1
3 1 roll               % sign yp xp
abs                    % sign yp |xp|
2 div                  % sign yp |xp|/2
exch                   % sign |xp|/2 yp
abs                    % sign |xp|/2 |yp|
dup                    % sign |xp|/2 |yp| |yp|
1 gt                   % sign |xp|/2 |yp| if |yp| > 1 rearrange xp,yp
{ 2 sub neg            % sign |xp|/2 2-|yp|
3 1 roll               % |yp|sign |xp|/2
1 sub neg              % |yp|sign 1-|xp|/2
3 1 roll               % |xp|/2 |yp| sign
neg                    % |xp|/2 |yp| -sign
3 1 roll               % sign |xp|/2 |yp|
} if
2 copy                 % sign |xp|/2 |yp| |xp|/2 |yp|
lt { exch } if         % if |xp|/2 < |yp| swap to : sign |yp| |xp|/2
pop                    % sign max(|xp|/2, |yp|)
1 sub                  % sign max-1
mul                    % (1 − max) or (max − 1) depending on sign.
} def                  % spotfunction
```

Once the spot function values 86 are established, the halftoning operation can proceed as shown in FIG. 14. The address generator 89 generates all possible combinations or addresses (i,j) to cover the area occupied by the halftone image 81 on the recorder grid. Every address (i,j) addresses a contone pixel 90 in the contone image 91 having a contone value 82. This contone value 82 is fed into the comparator 84. At the same time, the address (i,j) is fed into the scaling and rotation unit 72. This unit converts the address (i,j) to another address (x,y) within the coordinate system of the screen function 86. The scaling factor is based on the required screen ruling, the rotation is based on the relative angle of the carrier grid of the screen 86 with respect to the recorder grid 81. Because the screen is periodical in x and y, only one template must be stored and the x and y coordinates can be reduced to [0 . . . TS] by a modulo operation on x and y, respectively shown in 92 and 93. TS is the tile size, giving the width and height of the spot function 86. The resulting x' and y' values address in the threshold matrix 86 the threshold value 83 to be compared with the contone pixel value 82.

The scaling and rotation operation can be avoided by previous computation of a pre-angled tile. Depending on the screen angle, this tile covers one or more halftone dots. It is clear that the halftone dot centroids will not shift along the diagonal of this pre-angled tile but along or parallel to the diagonal of the carrier grid. The carrier grid can be obtained by connecting with straight lines the smallest halftone holes that are closest to each other.

A second representative of a halftone generator is shown in FIG. 15. A halftone bitmap is stored for each tone level z in a three dimensional look up table 71. Two of the three addresses (x,y,z) of this look up table are position coordinates (x',y') that are obtained by rotating and scaling the (i,j) coordinate values of the recorder grid by the coordinate scaling and rotation unit 72. The third dimension z is the tone value of the contone pixel 73 in the continuous tone image 74 that is to be screened. The operation of the circuit is shown in FIG. 15 and is equivalent to the operation of the circuit shown in FIG. 14. Since the halftone bitmap (e.g. 75, 76, 77, 78) for each tone level is independently stored, it is possible to use halftone dots (e.g. 79, 80) with different dot centers at each tone level as demonstrated in FIG. 15. Also here the scaling and rotation unit 72 can be omitted by using pre-angled tiles.

Another apparatus to obtain a halftone image in which the position of the halftone dot centroid relative to the carrier grid is image level dependent or depends on the size of the halftone dot is depicted in FIG. 16. The operation is the same as for the apparatus described in FIG. 14, with the exception that the continuous tone pixel value 82 is transformed to a coordinate shift 95 by a tone level to spatial shift transformation unit 96. Pixel values in a continuous tone image represented by eight bits per pixel are transformed from the range [0,255] to the range [0,TS/2], where TS is cell size in number of recorder elements for the non rotated screen grid. The coordinate shift value 95 is added to x and y, giving x" and y" respectively. Via the modulo operation x" and y" are reduced to the first period of the periodical screen cell, and (x',y') is used to address the requested threshold value 83 within the screen function values 86. The transformation [0,255] to [0,TS/2] can be linear or non-linear.

The screens according to this invention are suited for the transformation of a color-image to a set of halftone images. Traditionally the color-image is separated in three or four color components. For each component a separate halftone image is produced. These halftone images are inked with the appropriate colored ink, and printed on top of each other to give a color reproduction of the original color image. In the step of producing a halftone image, a suitable screen must be selected to convert the continuous tone image to a halftone image. We have found that by application of a screen according to this invention for at least one of the halftone images, the rosette structures shift from clear centered rosettes in the highlights to dot centered rosettes in the dark areas, giving better control over the color balance and less visibility of the rosette structures. This means that a set of screens comprising at least one screen according to the present invention can be used to make color image reproductions that have the advantages mentioned in the objects of the invention. Preferably a screen according to the present invention can be used for each of three or more halftone images corresponding to the different color components of an image to be reproduced. The orientation of the screen is preferably different for each color component, and can be preferably 15°, 45° and 75° for three color components.

Moreover, at least one halftone image, having the properties as described in conjunction with FIG. 11c or 11f can be used together with other types of halftone images from the same original color image, to obtain a color reproduction that has the advantages described in the objects of the invention. Preferably, three or more halftone images have the properties of the shifting centroid as a function of the original image level or dot or hole area.

More generally, the objects of the present invention can be realized by any combination of halftone images that cause a variable rosette structure as a function of the image density. The best results can be obtained when the rosette structure is clear centered in low density areas and dot centered in high density areas. In midtone areas, the rosette structure evolves preferentially continuously from clear centered to dot centered as the density increases.

Although the halftone images having the properties of the tone dependent centroid position can be obtained by various methods, a preferred embodiment is one wherein the special type of screen, like the one as shown in FIG. 10a but not restricted to that one, is used to convert the continuous tone image into a halftone image.

Although the present invention has been described with reference to preferred embodiments, those skilled in the art will recognise that changes may be made in form and detail without departing from the spirit and scope of the invention.

I claim:

1. A printing plate having ink-accepting and non-ink-accepting zones which are arranged to form a halftone image comprising isolated high density halftone dots and isolated low density halftone dots, said high and low density halftone dots being situated within halftone cells of a carrier grid, wherein a position of a centroid point of said high and low density halftone dots within each said halftone cell varies with an area of each said halftone dot.

2. The printing plate of claim 1, wherein each said centroid point is located proximate to a diagonal line of said halftone cell.

3. The printing plate of claim 1, wherein a distance between each said centroid point and a corner point of said halftone cell is proportional to a size of each said halftone dot, the corner point for one said low density halftone dot being selected on an opposite side of a same halftone cell diagonal as a corner point for one said high density halftone dot.

4. A printing plate having ink-accepting and non-ink-accepting zones which are arranged to form a combination of halftone images, suitable for a multi-tone or color reproduction of an image, wherein at least one of said combination of halftone images comprises both isolated high density halftone dots and isolated low density halftone dots, each of said high and low density halftone dots being situated within halftone cells of a carrier grid, wherein a position of a centroid point of said high and low density halftone dots within each said halftone cell varies with an area of each said high and low density halftone dot.

5. A printing plate having ink-accepting and non-ink-accepting zones which are arranged to form a halftone reproduction comprising a set of halftone images, wherein each halftone image of said set is characterized by superimposed halftone images of the set which yield clear centered rosettes in low density halftone dot regions and dot centered rosettes in high density halftone dot regions.

6. The printing plate of claim 5, wherein said set is further characterized by visible intermediate rosettes which gradually evolve from a clear centered structure to a dot centered structure as visual density increases.

* * * * *